(12) United States Patent
Mueller

(10) Patent No.: US 9,365,138 B2
(45) Date of Patent: Jun. 14, 2016

(54) SEAT DIVIDER DEVICE

(71) Applicant: RECARO Aircraft Seating GmbH & Co. KG., Schwabisch Hall (DE)

(72) Inventor: Kurt Mueller, Ravensburg (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 14/013,164

(22) Filed: Aug. 29, 2013

(65) Prior Publication Data

US 2014/0062149 A1 Mar. 6, 2014

(30) Foreign Application Priority Data

Aug. 31, 2012 (DE) .......................... 10 2012 108 119

(51) Int. Cl.
 *B60N 2/44* (2006.01)
 *B23P 11/00* (2006.01)
 *B64D 11/06* (2006.01)

(52) U.S. Cl.
 CPC . *B60N 2/44* (2013.01); *B23P 11/00* (2013.01); *B64D 11/06* (2013.01); *B64D 11/0649* (2014.12); *Y02T 50/46* (2013.01); *Y10T 29/49947* (2015.01)

(58) Field of Classification Search
 CPC ...... B60N 2/44; B64D 11/0649; B64D 11/06; B23P 11/00

USPC .......................... 297/411.45, 411.28, 411.26
See application file for complete search history.

(56) References Cited

U.S. PATENT DOCUMENTS

| | | | |
|---|---|---|---|
| 4,099,780 A | 7/1978 | Schmidhuber | |
| 4,186,964 A * | 2/1980 | Marrujo et al. | 297/411.45 X |
| 4,498,649 A | 2/1985 | Toll | |
| 6,776,457 B2 | 8/2004 | Muin et al. | |
| 7,360,832 B2 | 4/2008 | Yokota et al. | |

FOREIGN PATENT DOCUMENTS

| | | |
|---|---|---|
| DE | 75 17 891 | 9/1975 |
| DE | 102 14 104 C1 | 12/2003 |
| DE | 10 2006 003 617 A1 | 7/2007 |
| DE | 10 2008 050 158 A1 | 5/2009 |

OTHER PUBLICATIONS

Search Report issued in corresponding DE patent application No. 10 2012 108 119.0 (and partial English translation).

* cited by examiner

*Primary Examiner* — Anthony D Barfield
(74) *Attorney, Agent, or Firm* — Posz Law Group, PLC

(57) ABSTRACT

A seat divider device, in particular an air passenger seat divider device, has at least one seat divider unit which has at least two main support elements formed separately from one another.

8 Claims, 5 Drawing Sheets

SEAT DIVIDER DEVICE

CROSS REFERENCE TO RELATED APPLICATIONS

Figure 1:
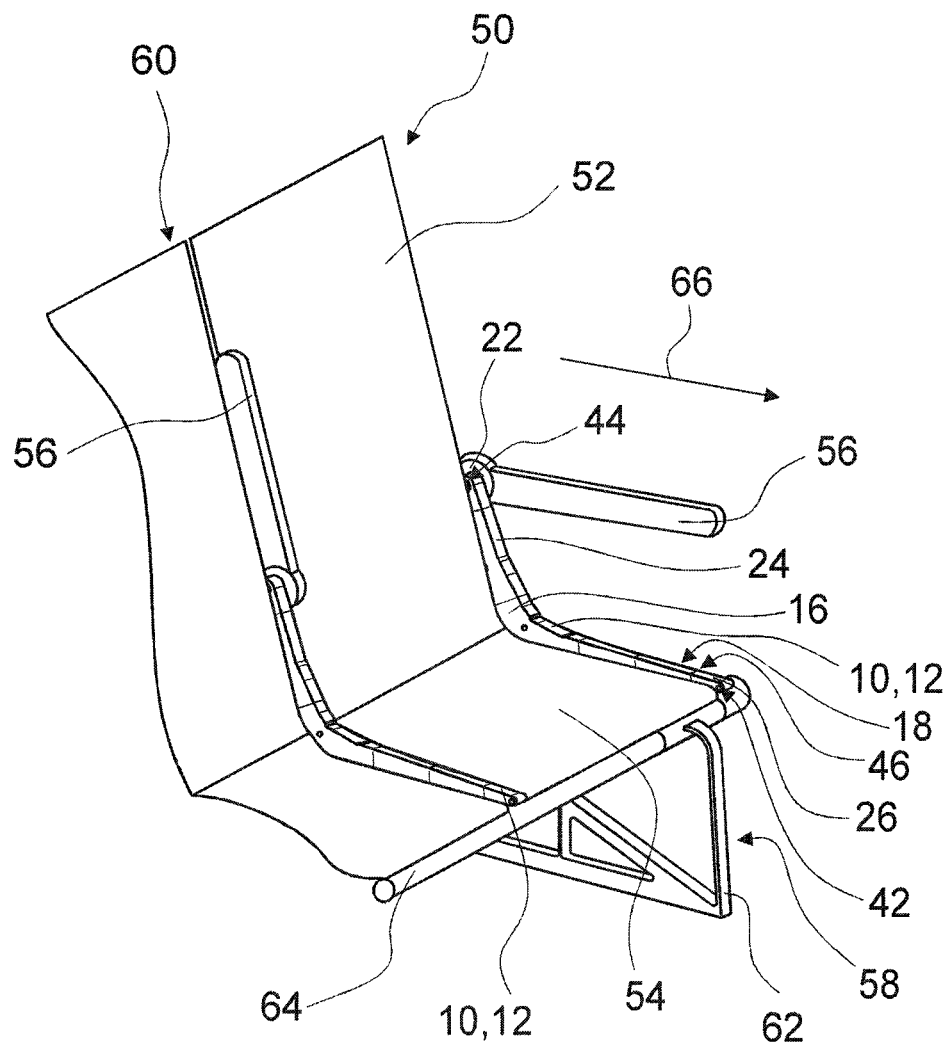

This application is based on and incorporates herein by reference German Patent Application No. 10 2012 108 119.0 filed on Aug. 31, 2012.

PRIOR ART

The invention relates to a seat divider device according to claim 1.

A seat divider device having at least one seat divider unit which has two main support elements separated by a further main support element has already been proposed. The main support elements form an open profile and are manufactured in unipartite form from one casting, and preferably from aluminum. The seat divider device is preferably forged and milled.

It is the object of the invention in particular to provide a device of the generic type which has improved characteristics with regard to weight and flexibility. The object is achieved according to the invention by means of the features of Patent Claim 1, while advantageous embodiments and refinements of the invention emerge from the subclaims.

ADVANTAGES OF THE INVENTION

There is proposed a seat divider device, in particular an air passenger seat divider device, having at least one seat divider unit which has at least two main support elements formed separately from one another. A "seat divider unit" should be understood in particular to mean a unit which has at least one seat divider. A "seat divider" should be understood in particular to mean a component of a row of seats with at least two seats arranged laterally adjacent one another, which component is arranged, at least substantially, above at least one transverse support, in particular a single beam and/or a transverse bar, with respect to a vertical direction oriented vertically with respect to a stand surface of the seat row. In particular, the seat divider is a rigidly formed component of the row of seats. The seat divider is preferably arranged, with respect to the vertical direction, at least substantially, above a seat base of a respective seat of the at least two seats, arranged laterally adjacent one another, of the row of seats. The seat divider is in particular provided for the mounting of an armrest unit. The seat divider is preferably provided for permitting the connection of a belt. In particular, the seat divider is provided for receiving a supporting tube. The seat divider preferably forms a lateral delimitation of at least one of the at least two seats arranged laterally adjacent one another, wherein the seat divider may be arranged at the aisle side and/or inboard side, and/or may form a delimitation between two seats, arranged laterally adjacent one another, of the at least two seats. In particular, the seat divider is a constituent part of a force dissipation path which runs via the backrest unit, the seat divider, a supporting tube structure and the stand unit into a stand surface, in particular into an aircraft floor. A "main support element" should be understood in particular to mean an element of a seat divider unit mounted on a seat unit, which element is provided such that, in at least an assembled state of the seat divider unit, it absorbs a force exerted on the seat unit and transmits said force to a further unit, in particular to a stand unit. Two main support elements "formed separately from one another" should be understood in particular to mean that the main support elements are formed separately from one another, and in particular so as to be isolated from one another, in at least one state, in particular in a state before assembly of the seat divider unit. "Provided" should be understood in particular to mean specially configured and/or equipped. By means of a configuration according to the invention, it is advantageously possible for a seat divider device to be adapted in a flexible manner to respective requirements merely by virtue of a required number of main support elements being used in each case. As a result of a lower number of main support elements, it is advantageously possible to save weight and also material and construction costs. In particular, it is advantageously possible to attain a flexible adaptation of the seat divider device to a respective seat unit on which the seat divider device is to be mounted.

It is also proposed that at least two of the main support elements are formed as two side walls which are formed separately from one another. In particular, the seat divider unit may have more than two main support elements formed separately from one another. A "side wall" should be understood in particular to mean a wall which, in at least an assembled state of the seat divider unit, forms a lateral delimiting surface of the seat divider unit. The two main support elements are preferably formed as two side walls situated opposite one another. In particular, the two main support elements are formed as two side walls situated opposite one another with respect to a transverse direction which is oriented, at least substantially, perpendicular to a seating direction and, at least substantially, parallel to a horizontal direction. A "seating direction" should be understood in particular to mean a direction which, when a passenger is seated in the intended manner, in particular when the passenger has their thighs oriented parallel, corresponds substantially to the direction in which the thighs of the passenger extend from the buttocks to the knee area. In an upright position of a seat, in which a backrest is oriented, at least substantially, perpendicular to a floor, the seating direction is oriented parallel to the floor and, at least substantially, perpendicular to the backrest surface formed by the backrest. If the seat device is used for an air passenger seat, the seating direction typically corresponds to the direction of flight. The phrase that a straight line and/or plane is oriented, "at least substantially, perpendicular" to a further straight line and/or plane formed separately from the first straight line and/or plane should be understood in particular to mean that the straight line and/or plane encloses with the further straight line and/or plane an angle which deviates from an angle of 90° by less than 5°, preferably less than 3° and in particular less than 1°. The phrase that a straight line and/or plane is oriented, "at least substantially, parallel" to a further straight line and/or plane formed separately from the first straight line and/or plane should be understood in particular to mean that the straight line and/or plane encloses with the further straight line and/or plane an angle which deviates from an angle of 0° by less than 5°, preferably by less than 3° and in particular by less than 1°. By means of a configuration according to the invention, it is advantageously possible to attain a stable and flexible seat divider device which can be adapted in a manner corresponding to a respective seat unit on which the seat divider device is to be mounted.

It is also proposed that at least one of the main support elements is in the form of a connecting element. A "connecting element" should be understood in particular to mean an element which is provided for producing a connection between at least two further elements formed separately from the main support element, in particular between two further main support elements formed separately from the main support element, and/or between at least two sub-regions of a further element formed separately from the main support element, in particular between two sub-regions of a further main support element formed separately from the main support element. In particular, a longitudinal direction of the main support element in the form of a connecting element is oriented, at least substantially, perpendicular to at least one longitudinal direction of at least one of the two further elements formed separately from the main support element and/or to at least one longitudinal direction of at least one of the two sub-regions of the one further element formed separately from the main support element. The longitudinal direction of the main support element in the form of a connecting element is preferably oriented, at least substantially, perpendicular to the seating direction. In particular, the seat divider unit has at least three main support elements formed separately from one another, wherein two of the main support elements are formed as side walls formed separately from one another, and at least one of the main support elements is in the form of a connecting element and is provided for connecting to one another the two main support elements formed as side walls. It is conceivable that, in addition to the three main support elements, further main support elements are provided which are in the form of connecting elements and which are provided for connecting to one another the two main support elements formed as side walls. In a further embodiment of the invention, it is conceivable for the seat divider unit to have at least two main support elements formed separately from one another, wherein one of the main support elements is formed as a side wall which is of unipartite form and which is curved, at least substantially, in a U-shaped manner, and at least one of the main support elements is in the form of a connecting element and is provided for connecting two sub-regions, in particular two limbs, of the main support element which is curved in a U-shaped manner and which is formed as a side wall. It is conceivable that, in addition to the three main support elements, further main support elements are provided which are in the form of connecting elements and which are provided for connecting the two sub-regions of the main support element which is curved in a U-shaped manner and which is formed as a side wall. An element which is "curved in a U-shaped manner" should be understood in particular to mean an element which has at least three sub-regions which are of unipartite or multi-part form and which, over at least a major part of a respective longitudinal extent, are of straight form, wherein one of the sub-regions is directly connected at two opposite ends to in each case one end of a further sub-region, and wherein the two further sub-regions are oriented in the same direction which is oriented, at least substantially, perpendicular to the first sub-region. It is preferable for a contact region between the respective sub-regions to be of angular and/or or rounded form. An element which is "curved, at least substantially, in a U-shaped manner" should be understood in particular to mean an element in which the two further sub-regions enclose in each case with the first sub-region an angle in a range from 60° to 120°, wherein an angle formed between one of the further sub-regions and the first sub-region may differ from an angle formed between a further sub-region, formed separately from the first further sub-region, and the first sub-region. The phrase that the sub-regions are, "over at least a major part of a respective longitudinal extent, of straight form" should be understood in particular to mean that each of the sub-regions has in each case a maximum longitudinal extent in a respective projection of the sub-regions onto a respective plane, wherein, in a normal state of the sub-regions, in which the sub-regions together form an element which is curved in a U-shaped manner, in each case a fraction of greater than 40%, preferably greater than 45% and in particular of greater than 50% of the respective maximum longitudinal extent is of straight form. By means of a configuration according to the invention, it is advantageously possible to attain a stable and flexible seat divider device which can be adapted in a manner corresponding to a respective seat unit on which the seat divider device is to be mounted.

It is also proposed that the seat divider unit, in at least an assembled state, is in the form of a box, when viewed in a cross-sectional plane. A "box" should be understood in particular to mean an element which, when viewed in the cross-sectional plane in the assembled state, has an at least substantially closed profile. In particular, when viewed in the cross-sectional plane in the assembled state, the closed profile encloses a cross-sectional area in the form of a recess. Preferably, when viewed in the cross-sectional plane in the assembled state, the box is, at least substantially, of rectangular form. In particular, when viewed in three dimensions, the seat divider unit encloses a cavity. A "cavity" should be understood in particular to mean a space which is delimited by at least one, in particular by at least two elements, specifically at least from at least three and preferably from at least four sides. The phrase that "the box is, at least substantially, of rectangular form" should be understood in particular to mean that the box, when viewed in the cross-sectional plane, has an areal extent which deviates by less than 20%, preferably by less than 10% and in particular by less than 5% from an areal extent of the smallest rectangle enclosing the box. A "closed profile" should be understood in particular to mean a profile which is formed from one and/or more parts. In particular, in the case of a multi-part design of the closed profile, the individual parts of the closed profile are directly connected to one another such that no gaps are formed between the individual parts of the closed profile. It is preferable if, in the case of a unipartite design, the closed profile, in a developed view of the closed profile in a plane, has two ends separated by an overall longitudinal extent of the closed profile, which ends, in a normal state of the closed profile, are directly connected to one another such that no gaps are formed between the two ends of the closed profile. An "at least substantially closed profile" should be understood in particular to mean a profile in which, in a developed view of the closed profile in a plane, a magnitude of an extent of the gap between the two ends, which are separated by an overall longitudinal extent of the closed profile, of the closed profile and/or a sum of a respective magnitude of a respective extent of the gaps between the individual parts of the closed profile amounts to less than 5%, preferably less than 3% and in particular less than 1% of a magnitude of an overall longitudinal extent of the closed profile. A "normal state" of the closed profile should be understood in particular to mean a state of the closed profile in which the closed profile is shaped such that the closed profile forms a box which is, at least substantially, of rectangular form. By means of a configuration according to the invention, it is advantageously possible for a weight of the seat divider unit to be reduced. Furthermore, by means of the configuration according to the invention, a stability of the seat divider unit and in particular a torsional rigidity of the seat divider unit can be increased.

It is also proposed that at least one of the main support elements is formed by a thin-walled element. In particular, at least one of the main support elements is in the form of a metal sheet. A "thin-walled element" should be understood in particular to mean an element which has a thickness which is significantly smaller than a width and/or a length of the element. A "thickness" of the element should be understood in particular to mean a minimum among the maximum extents of the element along any spatial directions. A "maximum extent" of an element along a spatial direction should be understood in particular to mean the maximum length of all distances that connect two edge points of the element and run parallel to the spatial direction. A "width" and a "length" of the element should be understood in particular to mean the maximum extents of the element along two spatial directions which are, at least substantially, perpendicular to one another and which are preferably, at least substantially, perpendicular to a spatial direction along which the element has the thickness as a maximum extent. In particular, the length and width of the element are the maximum extents along spatial directions for which the sum of the maximum extents are at a maximum. The phrase that a straight line and/or plane is oriented, "at least substantially, perpendicular" to a further straight line and/or plane formed separately from the first straight line and/or plane should be understood in particular to mean that the straight line and/or plane encloses with the further straight line and/or plane an angle which deviates from an angle of 90° by less than 5°, preferably less than 3° and in particular less than 1°. By means of a configuration according to the invention, a weight of the seat divider unit can advantageously be reduced.

It is also proposed that at least one of the main support elements is manufactured, at least partially, in a separation process. In particular, at least one of the main support elements is manufactured, at least partially, in a laser-cutting process. It is preferable for at least one of the main support elements to be manufactured, at least partially, in a punching process. In particular, at least one of the main support elements is manufactured, at least partially, in a water-jet cutting process. The phrase that at least one of the main support elements is "manufactured, at least partially, in a separation process" should be understood in particular to mean that more than 80%, preferably more than 85% and in particular more than 90% of an overall surface area of the main support element is manufactured in a separation process. By means of a configuration according to the invention, it is advantageously possible for multiple different separation processes to be used for producing the main support elements, and thus for a level of flexibility to be increased.

It is also proposed that at least one of the main support elements is manufactured, at least partially, in a 3D process. The phrase that at least one of the main support elements is "manufactured, at least partially, in a 3D process" should be understood in particular to mean that more than 80%, preferably more than 85% and in particular more than 90% of an overall surface area of the main support element is manufactured in a 3D process. By means of a configuration according to the invention, it is advantageously possible for the main support elements to be manufactured in a flexible manner.

It is also proposed that at least one of the main support elements is formed, at least substantially, from a high-strength metal. In particular, the high-strength metal has a tensile strength in a range from 1200 N/mm$^2$ and 1400 N/mm$^2$. It is alternatively conceivable for the high-strength metal to have a tensile strength of greater than 1400 N/mm$^2$. For example, at least one of the main support elements is formed, at least substantially, from high-strength aluminum. It is likewise conceivable for at least one of the main support elements to be formed, at least substantially, from high-strength aluminum. In particular, at least one of the main support elements is formed, at least substantially, from high-grade steel. In particular, at least one of the main support elements is formed, at least substantially, from high-strength high-grade steel. Preferably, at least one of the main support elements is formed, at least substantially, from a hardenable high-grade steel. In particular, at least one of the main support elements is formed, at least substantially, from weldable high-grade steel. The phrase that at least one of the main support elements is "formed, at least substantially, from a high-strength metal" should be understood in particular to mean that a mass fraction of the high-strength metal in the at least one main support element is greater than 90%, preferably greater than 93% and in particular greater than 95%. By means of a configuration according to the invention, it is advantageously possible to attain a flexible seat divider unit through the use of different high-strength metals. Furthermore, through the use of a rust-resistant high-grade steel, a service life of the seat divider unit can be lengthened.

It is also proposed that at least one of the main support elements is formed, at least substantially, from a fiber-composite material. In particular, at least one of the main support elements is formed, at least substantially, from CFRP. It is alternatively conceivable for at least one of the main support elements to be formed, at least substantially, from an organosheet. In particular, at least one of the main support elements is formed, at least substantially, from a high-strength fiber-composite material. Preferably, at least one of the main support elements is formed, at least substantially, from a hardenable fiber-composite material. In particular, at least one of the main support elements is formed, at least substantially, from a weldable fiber-composite material. Preferably, at least one of the main support elements is formed, at least substantially, from one and/or more fiber-composite material panels. The phrase that at least one of the main support elements is "formed, at least substantially, from a fiber-composite material" should be understood in particular to mean that a mass fraction of the fiber-composite material in the at least one main support element is greater than 90%, preferably greater than 93% and in particular greater than 95%. By means of a configuration according to the invention, it is advantageously possible to attain flexibility through the use of different compositions of the fiber-composite material.

It is also proposed that at least two of the main support elements are connected by means of a welded connection. It is alternatively conceivable for at least two of the main support elements to be connected by means of an adhesive connection. In particular, at least two of the main support elements are connected by means of a laser-welded connection. By means of a configuration according to the invention, it is advantageously possible to attain a stable seat divider unit. Furthermore, by dispensing with connecting means, such as for example screws, rivets and/or latching means, weight and construction costs can be reduced. Furthermore, by means of the configuration according to the invention, a secure connection between the main support elements can be attained.

It is also proposed that at least two of the main support elements are connected by means of a plug-in connection. It is likewise conceivable for at least two of the main support elements to be connected by clinching, by means of a 3D printing process and by means of forging and/or milling. A "plug-in connection" should be understood in particular to mean a connection between at least two elements, in particular between at least two main support elements, wherein, in a connected state, one of the elements is, in at least one sub-region of the element, surrounded, at least partially, by a further element formed separately from the first element. In particular, in the connected state, the first element is surrounded, in at least one end region of the element, by the further element. By means of a configuration according to the invention, it is advantageously possible to attain a flexible connection between the main support elements, which connection can be produced and released quickly.

In a further embodiment of the invention, there is proposed a seat, in particular an air passenger seat, having at least one seat divider device according to the invention. By means of a configuration according to the invention, it is possible in an advantageous manner for a seat to be equipped with a seat divider device according to the invention, whereby a particularly lightweight seat can be realized.

In a further embodiment of the invention, there is proposed a method for producing a seat divider device according to the invention. By means of a configuration according to the invention, it is advantageously possible for a seat divider device to be manufactured quickly, reliably and in a reproducible manner.

It is also proposed that the main support elements are connected to one another by means of at least one plug-in connection. By means of a configuration according to the invention, the main support elements can advantageously be connected to one another in a simple and fast manner, whereby a flexible connection can be realized between the main support elements, which connection can be produced and released quickly.

It is also proposed that the main support elements are welded. In particular, the main support elements are laser-welded. By means of a configuration according to the invention, it is advantageously possible to attain a stable seat divider unit. Furthermore, by dispensing with connecting means, weight and construction costs can be reduced.

DRAWINGS

Further advantages will emerge from the following description of the drawings. The drawings illustrate an exemplary embodiment of the invention. The drawings, the description and claims contain numerous features in combination. A person skilled in the art will expediently also consider the features individually and combine them to form further meaningful combinations.

Figure 2:
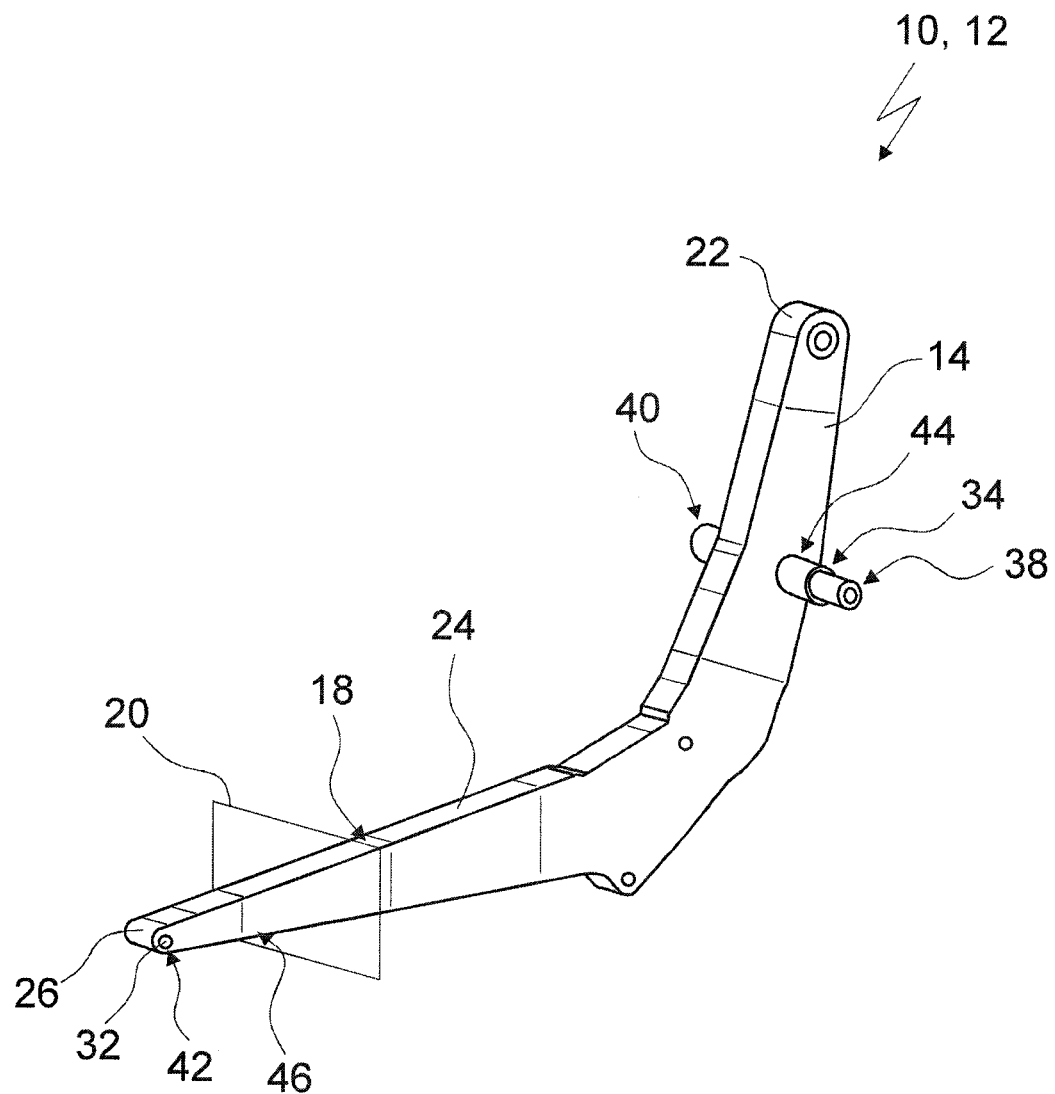
Figure 3:
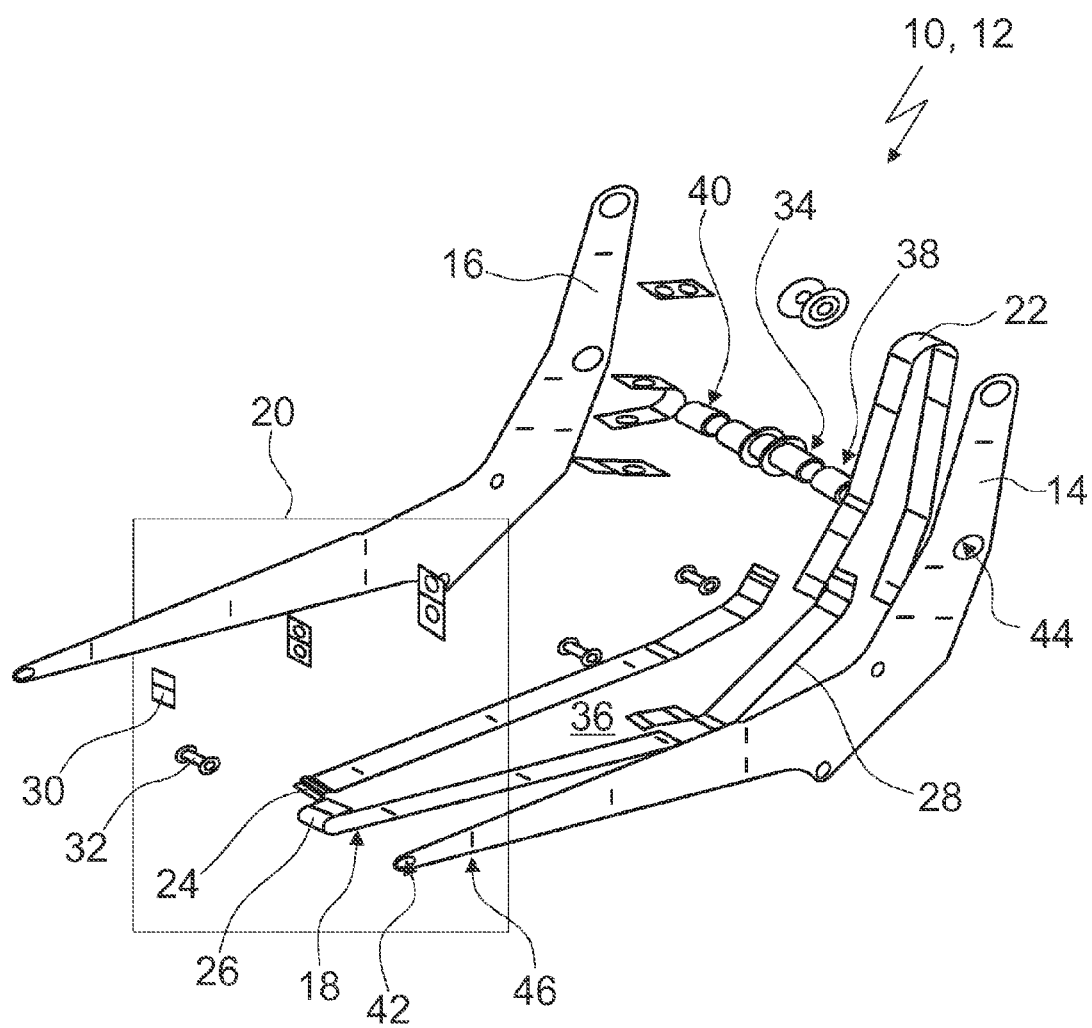
Figure 4A:
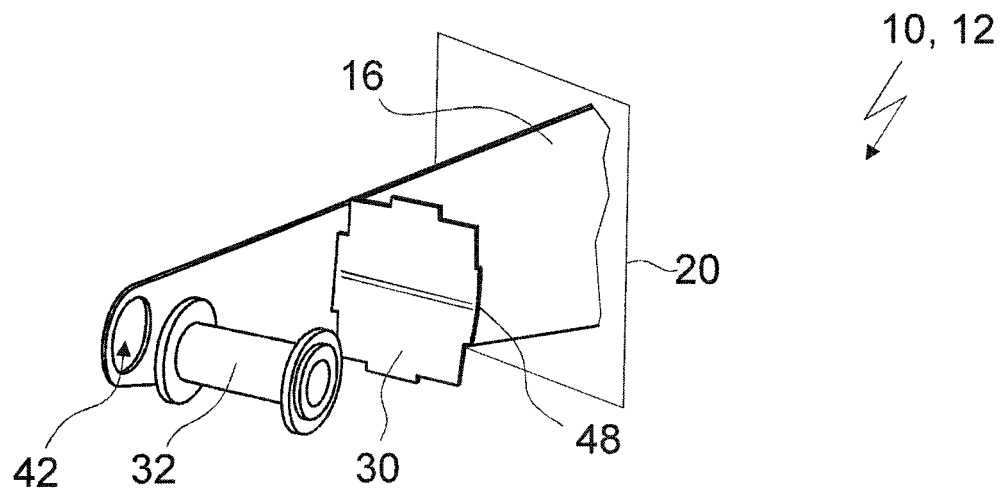
Figure 4B:
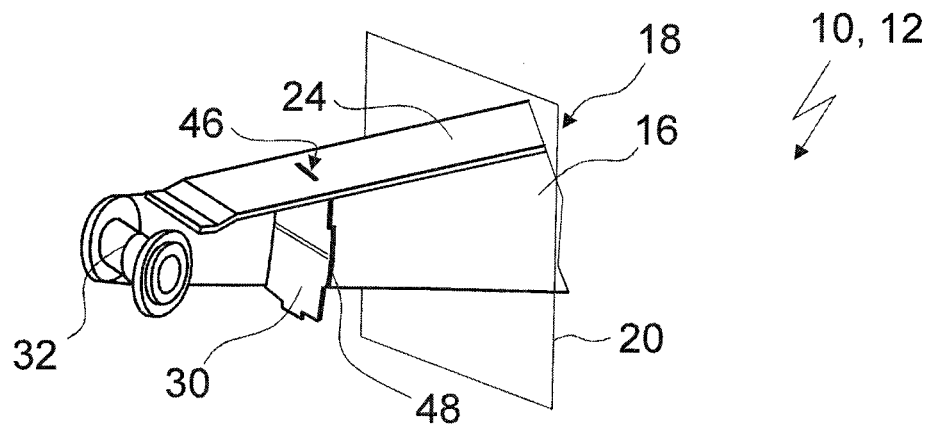
Figure 4C:
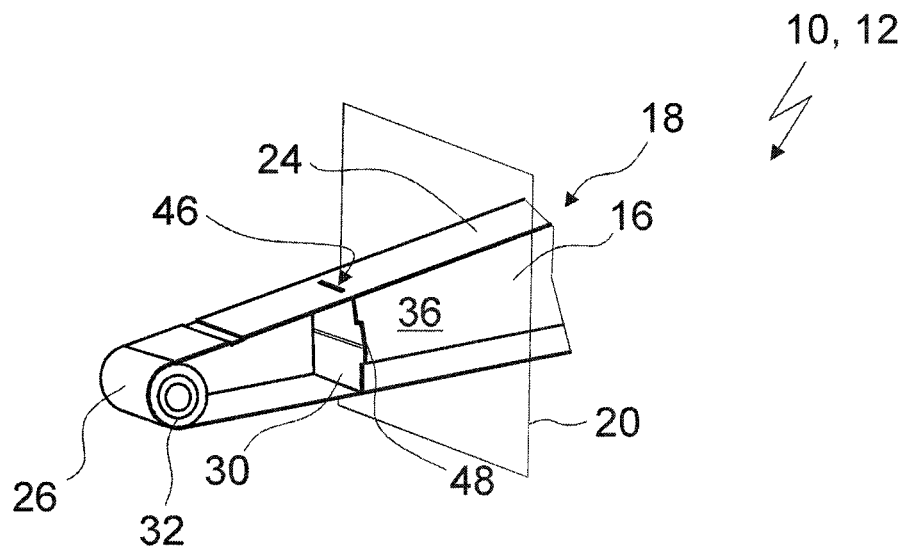
Figure 4D:
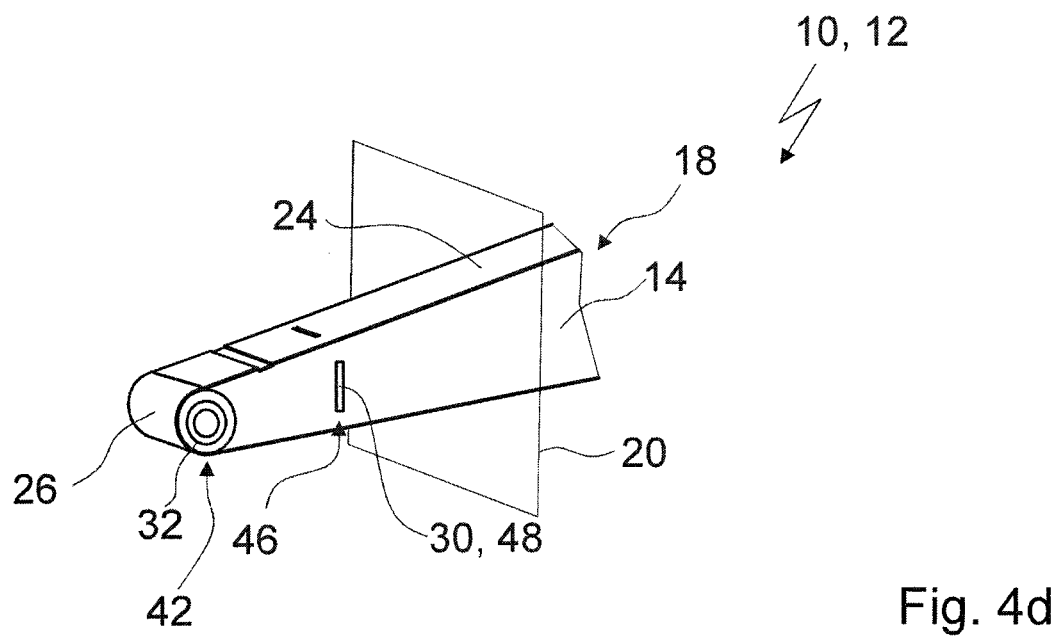

In the drawings:

FIG. 1 shows a detail of a row of seats having a seat according to the invention with a seat divider device according to the invention, FIG. 2 shows a seat divider device according to the invention in a three-dimensional illustration, FIG. 3 shows the seat divider device according to the invention from FIG. 1 in an exploded illustration, and FIGS. 4a-d show different method steps of a method for the assembly of the seat divider device according to the invention as per FIGS. 1 and 2.

DESCRIPTION OF THE EXEMPLARY EMBODIMENT

FIG. 1 shows a detail of a row of seats having a seat according to the invention with a seat divider device 10 according to the invention. In addition to the first seat divider device 10 of the seat 50, the figure also shows a further seat divider device 10 which is assigned both to the seat 50 and also to a seat 60 which is adjacent to the seat 50 and which is only partially illustrated. For clarity, in FIG. 1, only one of the two seat divider devices 10 is fully labeled with reference numerals. The seat 50 according to the invention has a backrest 52, a seat base 54 and two armrest elements 56. The seat 50 is mounted on a stand unit 58 of the row of seats. Of the stand unit 58, only a foot element 62 and a transverse support 64 are shown, because a remaining part of the stand unit is arranged outside the illustrated detail of the row of seats and/or is hidden by other parts of the row of seats.

FIG. 2 shows, in a three-dimensional illustration, the seat divider device 10 according to the invention, in particular air passenger seat divider device, having a seat dividing unit 12 which has multiple main support elements 14, 16, 18, 30, 32, 34 formed separately from one another (cf. also FIG. 3). Of the main support elements 14, 16, 18, 30, 32, 34, FIG. 2 shows only the main support elements 14, 18, 32, 34, because the main support elements 16, 30 are hidden. Two of the main support elements 14, 16 are formed as side walls formed separately from one another. Several of the main support elements 18, 30, 32, 34 are in the form of a connecting element. The main support element 18 in the form of a connecting element is provided so as to connect the main support elements 14, 16, which are formed as side walls, to one another in an assembled state of the seat divider unit 12. The main support element 18 in the form of a connecting element is of multi-part form (cf. FIG. 3) and has four parts 22, 24, 26, 28. The parts 22, 24, 26, 28 are connected to one another by means of in each case one welded connection in an assembled state of the seat divider unit 12. Furthermore, in the assembled state of the seat divider unit 12, the main support element 18 and thus likewise the parts 22, 24, 26, 28 are connected in each case by means of a welded connection to the main support elements 14, 16 formed as side walls. It is alternatively conceivable that, in the assembled state of the seat divider unit 12, the main support element and thus likewise the parts 22, 24, 26, 28 are connected by means of multiple welded connections to the main support elements 14, 16 formed as side walls. In the assembled state of the seat divider unit 12, the main support elements 14, 16, 18 enclose a cavity 36.

FIG. 3 shows the seat divider device 10 according to the invention from FIG. 2 in an exploded illustration. It can also be seen from FIG. 3 that the main support elements 14, 16, 18, 30 are formed by thin-walled elements. In the exemplary embodiment shown, the main support elements 14, 16, 18, 30 are formed from thin-walled metal sheets. The main support elements 32, 34 are formed not only as connecting elements but also in each case as torsion bars. All of the main support elements 14, 16, 18, 30, 32, 34 are manufactured in a separation process. In the present exemplary embodiment, the main support elements 14, 16, 18, 30, 32, 34 are manufactured in a laser-cutting process. It is alternatively and/or additionally conceivable that the main support elements 14, 16, 18, 30, 32, 34 are manufactured in a water-jet cutting process. It is alternatively and/or additionally conceivable that the main support elements 14, 16, 18, 30, 32, 34 are manufactured in a punching process. It is also alternatively and/or additionally conceivable that the main support elements 14, 16, 18, 30, 32, 34 are manufactured in a 3D process. Furthermore, all of the main support elements 14, 16, 18, 30, 32, 34 are formed from a high-strength metal. All of the main support elements 14, 16, 18, 30, 32, 34 are formed from a high-strength, hardenable and weldable metal. In the present exemplary embodiment, the main support elements 14, 16, 18, 30, 32, 34 are formed from high-strength, hardenable and weldable high-grade steel. It is alternatively conceivable for the main support elements 14, 16, 18, 30, 32, 34 to be formed from a fiber-composite material. Here, the main support elements 14, 16, 18, 30, 32, 34 are formed from a high-strength fiber-composite material. Viewing FIGS. 1 to 4 together, it emerges that the seat divider unit 12, in the assembled state, is in the form of a box, when viewed in a cross-sectional plane 20. Viewed in a three-dimensional illustration, it follows that the seat divider unit 12, in the assembled state, surrounds the cavity 36.

A construction of the seat divider device 10 according to the invention will be explained below on the basis of FIG. 3.

As already mentioned, in the assembled state of the seat divider unit 12, the main support elements 14, 16 are connected to one another by the main support element 18. In this way, a stability and in particular a torsional rigidity of the seat divider unit 12 can advantageously be improved. To further improve the stability of the seat divider unit 12, the main support elements 30, 32 are formed not only as connecting elements but also as stabilizing elements. For clarity, in FIG. 3, in each case only one of the main support elements 30, 32 is labeled with reference numerals. The main support elements 30, 32 are arranged entirely in the cavity 36 formed by the main support elements 14, 16, 18 and are connected in each case to the main support elements 14, 16, 18. The main support element 34 is formed not only as a connecting element but also as a torsional connection for the backrest 52 of the seat 50 (cf. FIG. 1) on which the seat divider device 10 can be mounted. For this purpose, the main support element 34 has two sub-regions 38, 40 arranged on sides, facing away from one another, of the main support element 34, which sub-regions, in the assembled state of the seat divider unit 12, are arranged outside the cavity 36 formed by the main support elements 14, 16, 18. A further sub-region, arranged between the sub-regions 38, 40, of the main support element 34 is, in the assembled state of the seat divider unit 12, arranged within the cavity 36 formed by the main support elements 14, 16, 18. If it is the intention for the seat divider unit 12 to form a lateral delimitation of the seat 50, one of the sub-regions 38, 40 may be omitted, such that the main support element 34 terminates flush with the respective main support element 14, 16. For example, in the arrangement shown in FIG. 1, in the case of the seat divider unit 12 of the seat divider device 10 at which the armrest element 56 of the seat 50 points in a seating direction 66, the sub-region 38 of the main support element 34 may be omitted.

In the assembled state of the seat divider unit 12, the main support elements 14, 16, 18, 30, 32, 34 are connected by means of a plug-in connection. To permit such a plug-in connection, the main support elements 14, 16 have fastening recesses 42 corresponding to a shape of the main support elements 32. A respective number of fastening recesses 42 corresponds to a number of main support elements 32. For clarity, in FIGS. 2-4, in each case only one of the fastening recesses 42 is labeled with reference numerals. In the assembled state of the seat divider unit 12, the main support elements 32 engage, by way of their respective ends, into the fastening recesses 42 of the main support elements 14, 16.

To realize a plug-in connection between the main support elements 14, 16 and the main support element 34, the main support elements 14, 16 have each case one fastening recess 44 which corresponds to a shape of the main support element 34. For clarity, in FIGS. 2-3, in each case only one of the fastening recesses 44 is labeled with reference numerals. In the assembled state of the seat divider unit 12, the main support element 34 is inserted into the respective fastening recess 44 of the respective main support element 14, 16 such that the sub-regions 38, 40 are arranged outside, and the further sub-region is arranged inside, the cavity 36 enclosed by the main support elements 14, 16, 18.

The main support elements 14, 16, 18 have a multiplicity of plug-through openings 46. In a manner corresponding to a shape of the plug-through openings 46, the main support elements 30 have in each case at least four plug-through projections 48 (cf. FIGS. 4a-d). For clarity, in FIGS. 2-4, in each case only one of the plug-through openings 46 is labeled with reference numerals. Analogously, for clarity, in FIGS. 4a-c, in each case only one of the plug-through projections 48 is labeled with reference numerals. The plug-through openings 46 are provided so as to receive the plug-through projections 48 of the main support elements 30 in the assembled state of the seat divider unit 12.

In addition to the fact that the main support elements 14, 16, 18, 30, 32, 34 are connected by means of a plug-in connection, the main support elements 14, 16, 18, 30, 32, 34 are connected by means of a welded connection. In the exemplary embodiment shown, the main support elements 14, 16, 18, 30, 32, 34 are connected by means of a laser-welded connection.

FIGS. 4a-d show a method for the assembly of the seat divider device 10 according to the invention. Firstly, the main support elements 14, 16, 18, 30, 32, 34 are correspondingly arranged in an assembly position. Subsequently, the main support elements 14, 16, 18, 30, 32, 34 are connected to one another by means of multiple plug-in connections. Finally, the main support elements 14, 16, 18, 30, 32, 34 are welded. In the exemplary embodiment shown, the main support elements 14, 16, 18, 30, 32, 34 are laser-welded.

REFERENCE NUMERALS

10 Seat divider device
12 Seat divider unit
14 Main support element
16 Main support element
18 Main support element
20 Cross-sectional plane
22 Part
24 Part
26 Part
28 Part
30 Main support element
32 Main support element
34 Main support element
36 Cavity
38 Sub-region
40 Sub-region
42 Fastening recess
44 Fastening recess
46 Plug-through opening
48 Plug-through projection
50 Seat
52 Backrest
54 Seat base
56 Armrest element
58 Stand unit
60 Seat
62 Foot element
64 Transverse support
66 Seating direction

The invention claimed is:

1. An air passenger seat divider device, comprising:
at least one seat divider unit which, in at least an assembled state, is in the form of a box and has a substantially rectangular cross-section, including:
at least, two main sidewall support elements, each main sidewall support element comprising a sidewall of the one seat divider unit, wherein
the two main sidewall support elements have a constant profile thickness in a plane perpendicular to their main extension; and
at least two main connecting support elements connecting the two main sidewall support elements together into the one seat divider unit, each main connecting support element extending between and connecting together the two main sidewall support elements, wherein
the two main sidewall support elements respectively have a recess with an opening corresponding to the cross-sectional areas of the two main connecting support elements, and the two main connecting support elements pass through the recesses of the two main sidewall support elements,
wherein
in at least an unassembled state of the at least one seat divider unit, each of the main sidewall support elements and the main connecting support elements has a separate and distinctly formed structure from each other and another of the main sidewall support elements and the main connecting support elements,
wherein
the at least two main connecting support elements are formed as torsion bars.

2. An air passenger seat, comprising at least one seat divider device according to claim 1.

3. The air passenger seat divider device according to claim 1, further comprising an armrest unit pivotally mounted on the one seat divider unit.

4. The air passenger seat divider device according to claim 1, wherein
the two main connecting support elements each have a plug-shaped fastening end and the two main sidewall support elements each have a recess with a shape corresponding to the plug-shaped fastening end of each main connecting support element, and
the plug-shaped fastening ends of the main connecting support elements are plugged into the recesses of the main sidewall support elements.

5. The air passenger seat divider device according to claim 1, wherein the main connecting support element enclosing the cavity is of a multi-part form.

6. The air passenger seat divider device according to claim 1, wherein the at least two main sidewall support elements and the at least one of the main connecting support elements enclosing the cavity are formed by thin-walled elements.

7. The air passenger seat divider device according to claim 1, wherein at least one of the main connecting support elements includes at least three separate subparts, each subpart being connected to another subpart and to the two main sidewall support elements.

8. An air passenger seat divider device, comprising:
at least one seat divider unit which, in at least an assembled state, is in the form of a box and has a substantially rectangular cross-section, including:
at least two main sidewall support elements, each main sidewall support element comprising a sidewall of the one seat divider unit, wherein
the two main sidewall support elements have a constant profile thickness in a plane perpendicular to their main extension; and
at least two main connecting support elements connecting the two main sidewall support elements together into the one seat divider unit, each main connecting support element extending between and connecting together the two main sidewall support elements,
wherein
the two main sidewall support elements respectively have a recess with an opening corresponding to the cross-sectional areas of the two main connecting support elements, and the two main connecting support elements pass through the recesses of the two main sidewall support elements,
wherein
in at least an unassembled state of the at least one seat divider unit, each of the main sidewall support elements and the main connecting support elements has a separate and distinctly formed structure from each other and another of the main sidewall support elements and the main connecting support elements,
wherein
the two main sidewall support elements each have a slot-shaped opening and the two main connecting support elements each have a slot-shaped projection, and
the slot-shaped openings of the main sidewall support elements receive the slot-shaped projections of the main connecting support elements.

\* \* \* \* \*